US012764038B2

(12) United States Patent
Wang et al.

(10) Patent No.: US 12,764,038 B2
(45) Date of Patent: Oct. 13, 2026

(54) DATA-MODEL DUAL-DRIVEN CONGESTION CONTROL METHOD FOR DATA CENTER NETWORKS

(71) Applicant: Nanjing University of Aeronautics and Astronautics, Jiangsu (CN)

(72) Inventors: Ran Wang, Jiangsu (CN); Chengfeng Yang, Jiangsu (CN); Qi Zhu, Jiangsu (CN); Qiang Wu, Jiangsu (CN); Jie Hao, Jiangsu (CN)

(73) Assignee: Nanjing University of Aeronautics and Astronautics, Jiangsu (CN)

( * ) Notice: Subject to any disclaimer, the term of this patent is extended or adjusted under 35 U.S.C. 154(b) by 3 days.

(21) Appl. No.: 19/224,877

(22) Filed: Jun. 1, 2025

(65) Prior Publication Data

US 2026/0246714 A1 Aug. 20, 2026

(30) Foreign Application Priority Data

Feb. 17, 2025 (CN) ........................ 202510173468.9

(51) Int. Cl.
*H04L 41/16* (2022.01)
*G06N 3/092* (2023.01)
*H04L 43/0829* (2022.01)
*H04L 43/0864* (2022.01)
(Continued)

(52) U.S. Cl.
CPC ............ *H04L 41/16* (2013.01); *G06N 3/092* (2023.01); *H04L 43/0829* (2013.01); *H04L 43/0864* (2013.01); *H04L 43/0888* (2013.01); *H04L 47/11* (2013.01)

(58) Field of Classification Search
None
See application file for complete search history.

(56) References Cited

U.S. PATENT DOCUMENTS

2020/0074848 A1* 3/2020 Namba .................. G08G 1/012
2021/0112006 A1* 4/2021 Francini ................ H04L 47/115
(Continued)

OTHER PUBLICATIONS

Bahnasy et al., "Using Ethernet Commodity Switches to Build a Switch Fabric in Routers", Aug. 1, 2015, IEEE, 2015 24th International Conference on Computer Communication and Networks (ICCCN) (2015, pp. 1-8) (Year: 2015).*

*Primary Examiner* — Davoud A Zand
(74) *Attorney, Agent, or Firm* — JC ONE WORLD

(57) ABSTRACT

Disclosed in the present disclosure is a data-model dual-driven congestion control method for data center networks, which combines adaptability of deep reinforcement learning with fast responsiveness of conventional model mapping to address the problems of slow response speed and insufficient adaptability in a dynamic network environment in the prior art. The method employs a layered architecture, which includes an optimization engine module, a regulation control module, and a statistical information module. The optimization engine module learns network state data based on a deep reinforcement learning algorithm and dynamically optimizes a congestion control policy. The regulation control module quickly executes the policy by using a model mapping mechanism to regulate transmission rate in real time. The statistical information module continuously collects network state information to ensure that a system adapts to complex traffic changes.

5 Claims, 3 Drawing Sheets

(51) Int. Cl.
*H04L 43/0888* (2022.01)
*H04L 47/11* (2022.01)

(56) References Cited

U.S. PATENT DOCUMENTS

2021/0352001 A1* 11/2021 Tourrilhes ........... H04L 43/0876
2023/0188230 A1* 6/2023 Wang .................. H04B 17/336
370/329

* cited by examiner

DATA-MODEL DUAL-DRIVEN CONGESTION CONTROL METHOD FOR DATA CENTER NETWORKS

CROSS-REFERENCE TO RELATED APPLICATION

This application claims the priority benefit of China application serial no. 202510173468.9, filed on Feb. 17, 2025. The entirety of the above-mentioned patent application is hereby incorporated by reference herein and made a part of this specification.

TECHNICAL FIELD

The present disclosure relates to the field of computer network technology, specifically to a congestion control method and system suitable for data center networks, and in particular, to a hybrid congestion control algorithm combining conventional model mapping with deep reinforcement learning (DRL), which is used to optimize network resource utilization, increase throughput, reduce delay, and ensure network stability and performance for large-scale AI model training.

BACKGROUND

With the rapid development of generative artificial intelligence (AI) technologies, especially the wide application of large models like ChatGPT, the research and development of large AI models has emerged as a cutting-edge focus in science and technology. This trend has driven the upgrading of computing facilities in data centers, but has also brought new challenges. First, large model training requires highly parallel computing and frequent data exchange. Although this can accelerate computing, it easily causes network congestion, reducing resource utilization and training efficiency. In addition, training has an urgent demand for high bandwidth, but large-scale data transmission will further reduce bandwidth utilization. In addition, high data throughput and complexity pose a challenge to network stability. The network congestion or packet loss prolongs task processing time, thereby affecting system reliability. Therefore, to address the severe challenges faced by the data center network, an efficient congestion control policy is urgently needed to optimize resource utilization, improve network performance, and support large-scale model training.

Conventional congestion control schemes (e.g., DCTCP) lay a foundation for research on data center network transmission protocols, but their simple control policies exhibit significant limitations in optimizing queue length and increasing throughput. Improved schemes such as DCQCN, although enhancing adaptability to network states, still show slow response speed, high flow delay, and complex parameter adjustment in a dynamic environment, which increases the difficulty in actual deployment. Other schemes such as Swift and HPCC, although excellent in performance, are difficult to be popularized and applied to general commercial devices as they rely on complex hardware configurations. In addition, these schemes use a fixed event-action mapping mechanism and lack flexibility, making them difficult to adapt to rapid changes of network conditions.

In recent years, data-driven congestion control schemes (such as Aurora and AuTO) have shown great potential by using DRL technology. These schemes achieve real-time optimization in a dynamic environment by learning empirical data in a network and have excellent generalization ability and adaptability. Compared with the conventional schemes, they reduce the dependence on manual parameter adjustment and can adapt to complex and changeable network conditions. However, under unknown network conditions, these schemes may result in excessive or insufficient utilization of network resources due to improper resource allocation. In addition, the DRL algorithm still faces challenges in terms of convergence speed and stability. Especially in scenarios with high-frequency dynamic bandwidth variations, its response speed is relatively low, and thus the actual performance may be affected.

In the complex network environment for large AI model training, congestion control in the data center network faces more severe challenges, especially in scenarios such as dynamic bandwidth changes and frequent flow arrivals and departures. The congestion control scheme for large AI model training needs to have two capabilities: dynamic responsiveness and network adaptability. The former requires the scheme to quickly adjust the transmission rate to cope with frequent network state changes, and the latter requires the scheme to be able to flexibly adjust the policy according to the changes of links and traffic patterns. A model mapping-based congestion control scheme exhibits good dynamic responsiveness due to the simple signal-action mapping mechanism, but it lacks adaptability in a frequently changing network environment. In contrast, a data learning-based scheme, especially based on the DRL technology, exhibits a relatively strong network adaptability and can flexibly cope with dynamic changes. However, its application in high-frequency dynamic scenarios is limited due to relatively high computing overhead and relatively slow response. Therefore, in an environment for large AI model training, how to achieve a balance between dynamic response and network adaptation has become a key challenge for efficient congestion control designing.

The present disclosure provides a data-model dual-driven congestion control scheme for data center networks, which combines the flexible adaptability of DRL and the fast responsiveness of conventional model mapping. The method can effectively resolve the trade-off between dynamic response and network adaptation in existing congestion control schemes and provide an efficient and flexible solution for the data center network, and it is particularly applicable to high-load scenarios such as large AI model training.

SUMMARY

Objective of the present disclosure: The present disclosure provides a data-model dual-driven congestion control method and system for data center networks. By combining adaptability of DRL technology and fast responsiveness of conventional model mapping, the problems of insufficient response speed and limited adaptability in a dynamic network environment in the prior art are addressed, thereby optimizing network resource utilization, improving throughput and stability of the data center networks, effectively reducing flow completion time and communication delay, and thereby meeting requirements of application scenarios that require high bandwidth and high performance, such as large AI model training.

Technical solutions: Provided is a data-model dual-driven congestion control method for data center networks, which includes the following steps:

S1, constructing a system framework including an optimization engine module, a statistical information module, and a rate regulation control module, where the optimization engine module optimizes a congestion control sub-policy in real time by using an optimization algorithm, the statistical information module is responsible for collecting network operation data and providing support for a decision process and system monitoring of an optimization engine, the optimization engine module and the statistical information module jointly form an RL agent, and the regulation control module is configured to execute the sub-policy generated by the RL agent;

S2, constructing a parameterized rate regulation model for rates at a network end side, specifically including:

S21, calculating a convergence result by using a network parameter and queuing delay to serve as a reference for rate adjustment, where a calculation formula is as follows:

$$R_{REF} = \frac{1}{\delta \times d_q}$$

$$d_q = rtt_{new} - \min\{rtt_{new}, rtt_{min}\}$$

where $\delta$ is a regulation parameter and $0.5 \le \delta \le 1.5$, and the parameter is used to indicate a state of total network bandwidth and transmission requirement, and dg is the queuing delay and is a result obtained after serialization delay and minimum RTT processing are performed on an RTT feedback;

a rate update cycle needs to be adaptively adjusted based on network requirements, the parameter $\delta$ reflects the network requirements and is determined by link bandwidth and the number of connections, and the update cycle is designed as:

$$T_a = \delta \times K$$

$$T{+}{+}$$

where $T_a$ is an adaptive byte counter threshold, K represents the link bandwidth, and T++ represents an update of a byte counter; to improve convergence speed and fairness, the adaptive byte counter is designed to be independent of transmission rates, that is:

$$BC_a = \gamma \times R_C$$

$$BC{+}{+}$$

where $BC_a$ is an adaptive byte counter threshold, $\gamma$ is a regulation parameter and $0.5 \le \gamma \le 1.5$, and $R_C$ is a current transmission rate;

S22, designing a rate decrease mechanism for the regulation model, specifically as follows:

$$R_T = \begin{cases} R_C, & R_C < 8R_{REF} \\ \frac{R_C}{\mu_1}, & \text{otherwise} \end{cases}$$

$$R_C = \begin{cases} R_C\left(1 - \frac{\alpha}{2}\right), & R_C < 8R_{REF} \\ \frac{R_C}{\mu_2}, & \text{otherwise} \end{cases}$$

where $R_T$ represents a target transmission rate that needs to be reached through adjustment, $R_C$ represents a current end-side transmission rate, parameters $\mu_1$ and $\mu_2$ are regulation parameters, and $2 < \mu_1 \le \mu_2 \le 4$; the parameters are used to control aggressiveness of rate decrease when congestion occurs; if CNP is not received within a specified time, $\alpha$ needs to be updated, where $\alpha$ is a regulation factor, and g is a fixed value for adjusting $\alpha$;

$$\alpha = (1 - g)\alpha + g$$

S23, designing a rate increase mechanism for the regulation model, where the rate increase includes a fast recovery phase, an adaptive increase phase, and a hyper increase phase;

the fast recovery phase: when both a timer and the byte counter are smaller than a threshold, that is, T<F and BC<F, a fast recovery operation is performed, where $\mu_3$ is a regulation parameter and $6 \le \mu_3 \le 10$, and the design is as follows:

$$R_T = \begin{cases} R_T, & R_C < 3R_{REF} \\ R_T - \frac{R_C}{\mu_3}, & \text{otherwise} \end{cases}$$

$$R_C = \frac{R_C + R_T}{2}$$

the adaptive increase phase: when the timer or the byte counter is greater than the threshold, that is, T≥F or BC≥F, an adaptive additive increase operation is performed, where an adaptive increase step size is related to the current transmission rate and the link bandwidth, but not to the number of carried flows, and the design is as follows:

$$R_T = \begin{cases} R_T + \min(0.1R_C, \beta * R_L), & R_C < 3R_{REF} \\ R_T - \frac{R_C}{\mu_3}, & \text{otherwise} \end{cases}$$

$$R_C = \frac{R_C + R_T}{2}$$

where $R_L$ is link capacity, $\beta$ and $\mu_3$ are regulation parameters, and $0 < \beta < 1$;

the hyper increase phase: when both the timer and the byte counter are greater than the threshold, that is, T≥F and BC≥F, a hyper increase operation is performed, and the design $$R_T = \begin{cases} R_T + iR_{HAI}, & R_C < 3R_{REF} \\ R_T - \frac{R_C}{\mu_3}, & \text{otherwise} \end{cases}$$

$$R_C = \frac{R_C + R_T}{2}$$

where i=min(BC,T−F+1), $R_{HAI}$ is a fixed value 100 Mbps, and $\mu_3$ is a regulation parameter;

S24, setting a corresponding control parameter in the parameterized rate regulation model for rates at the network end side to be dynamically adjustable after an overall design of a regulation control model is determined, which is denoted as:

$$\theta:=\{\delta,\gamma,\beta,\mu_1,\mu_2,\mu_3\}$$

S3, optimizing the dynamically adjustable parameter in S23 based on a DRL algorithm and formulates a congestion control problem in a network as a Markov decision model, where the model includes setting state variables and a reward function, and for description of network conditions, a switch buffer occupancy rate Occ is introduced to describe congestion degree, and the indicator is represented by proportion of data packets marked with an ECN;

S4, designing and solving the state and the reward function in S3 based on the DRL algorithm, and selecting proximal policy optimization PPO as an RL controller, where the PPO algorithm performs policy optimization based on a Markov decision process.

Further, the specific process of S3 includes:

S31, setting the state variables required by the DRL algorithm the state variables include throughput, round-trip delay, and a packet loss rate of a current network, further include measurement of a transmission rate, and visualize availability of the network and bandwidth, where the transmission rate $\Delta R_t=(R_t-R_{t-1})/\min(R_{t-1}, R_t)$;

S32, setting the reward function required by the DRL algorithm the reward function is used to quantify a performance criterion of a task, thus instructing an agent to improve a generated sub-policy sequence in a training phase, and the RL agent collects a reward at each monitoring interval to interact with a network environment;

the reward function is designed as follows:

$$R=\left(\frac{thr-\omega_1\times \text{loss}}{rtt'}\right)\Big/\left(\frac{thr_{max}}{rtt_{min}}\right)+\omega_2\times\Delta R_t-\omega_3\times Occ$$

Where:

$$rtt'=\begin{cases} rtt_{min}, & \text{if } rtt_{min}\le rtt_{min}\le\omega_4\times rtt_{min}\\ rtt, & \text{otherwise}\end{cases}$$

where $\omega_1$ represents a penalty for a data packet loss, and $\omega_2$, $\omega_3$, and $\omega_4$ are weighting coefficients.

Still further, the design of the reward function includes considering that power=throughput/rtt, and power maximization is capable of reflecting a maximum throughput while minimizing network delay, and the design further includes considering a rate change of a sending rate and the switch buffer occupancy rate.

Further, an objective function of the PPO algorithm in S4 includes advantage estimation and calculation of probability ratio;

an advantage function is a difference value between an expected value for a given action in a state and an expected value of all possible actions in the same state; to estimate the advantage function, the PPO trains a value state function by using a neural network model, calculates a total reward for a given state from start to expected implementation, and finally performs the advantage estimation by using generalized advantage estimation GAE based on a value of a critic network;

the calculation of the probability ratio is as follows: $R_t(\theta)=\pi_\theta(a_t|s_t)/\pi_{\theta_{old}}(a_t|s_t)$, where $\pi_{\theta_{old}}$ is an old policy, and $\pi_\theta$ is an updated policy;

to avoid large-scale policy updates, the PPO algorithm clips a target to be within a range of the advantage estimation, which is defined as follows:

$$L_t^1=E\left[\min\left(R_t(\theta)\hat{A}_t,\ \text{clip}\ (R_t(\theta),1-\grave{o},1+\grave{o})\hat{A}_t\right)\right]$$

$\hat{A}_t$ is an estimated advantage at time t, and ò is a hyper-parameter that controls a clip range;

an optimization function for training the neural network model includes a squared error loss function:

$$L_t^2=\left(V_\theta(s_t)-V_t^{target}\right)^2$$

by combining an actor loss with a critic loss and entropy, the RL agent's objective function is constructed:

$$S=\beta_{entropy}\,E\left[-\pi_\theta(a_t|s_t)\log\pi_\theta(a_t|s_t)\right]$$

$$\max_\theta E\left[L_t^1-c_1L_t^2+c_2S\right]$$

where $c_1$ and $c_2$ are coefficients.

Further, in each iteration of the PPO algorithm, participants independently collect observed trajectory data including a state-action-reward sequence;

for a given trajectory, the GAE algorithm computes advantage estimation required for policy update at each time;

finally, using the collected observed trajectory data and estimates, the agent's function is maximized by stochastic gradient descent SGD.

Beneficial effects: The present disclosure provides a data-model dual-driven congestion control method by combining deep reinforcement learning technology with conventional model mapping mechanism, and features good balance between dynamic responsiveness and adaptability. Its fast signal-action mapping mechanism enables adjustment of the transmission rate in real time, and the DRL technology improves adaptability to a complex network conditions through dynamic learning. The method can significantly optimize bandwidth utilization, reduce communication delay and queue length, and improve network throughput. The method is applicable to high-performance and highly dynamic network environments such as large AI model training.

DESCRIPTION OF THE EMBODIMENTS

Figure 1:
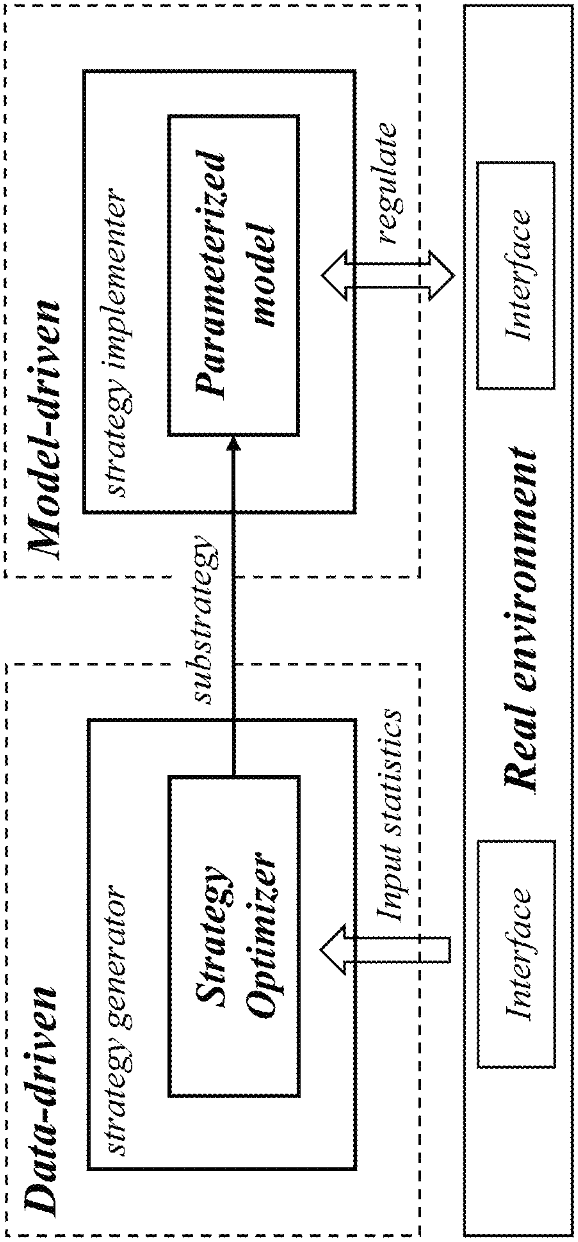
FIG. 1 is a schematic diagram showing the concept of data-model dual driving.
Figure 2:
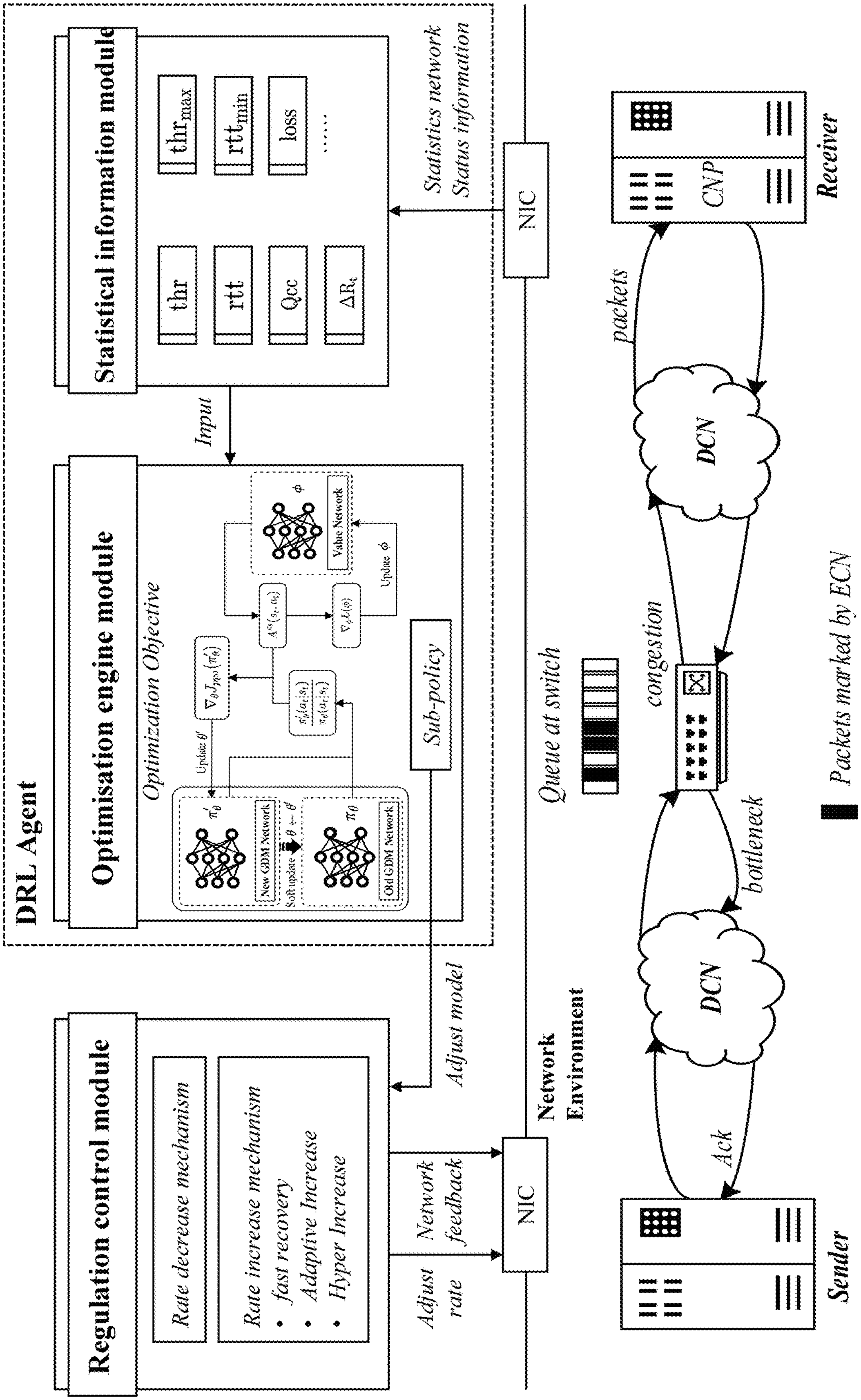
FIG. 2 is a framework of a data-model dual-driven congestion control method for data center networks.
Figure 3:
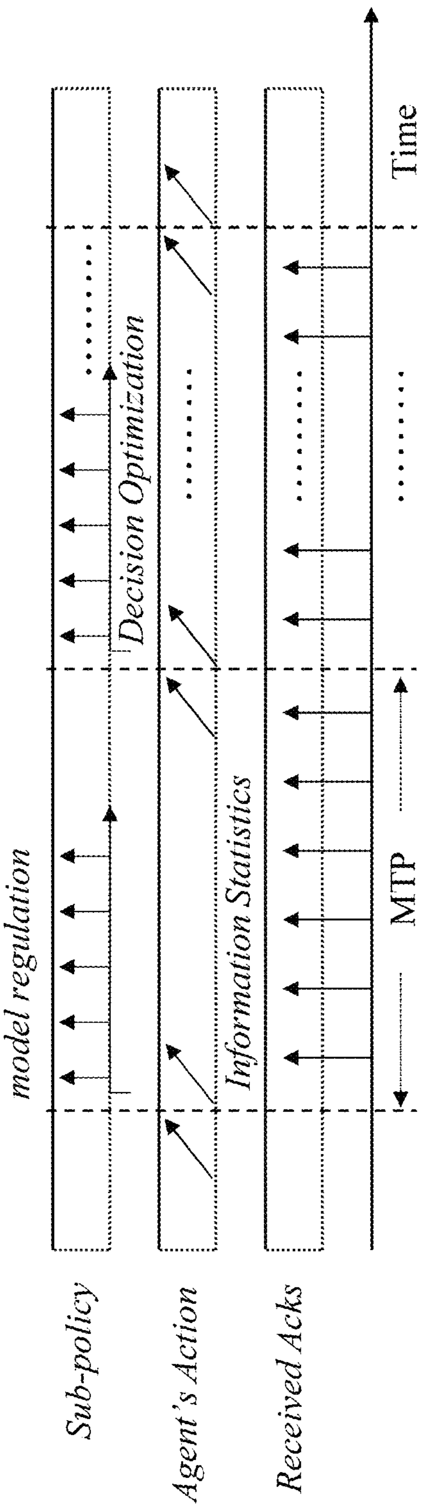
FIG. 3 is a flow diagram for executing a data center network algorithm based on data-model dual driving.

To describe technical solutions disclosed herein in detail, the present disclosure is further explained with reference to drawings and embodiments.

(1) Specific Architecture of System and Implementation Process

A data-model dual-driven congestion control system for data center networks provided in the present disclosure mainly includes three parts: a rate regulation control module, an optimization engine module, and a statistical information module. Functions of the modules and their collaborative relationships are as follows:

Statistical information module: This module is first responsible for collecting network operation data in real time, including key indicators such as throughput, round-trip delay, packet loss rate, and switch buffer occupancy rate, and then it performs standardized preprocessing on the data. Finally, it needs to periodically transmit the processed network state data to the optimization engine module to provide support for subsequent decision optimization.

Optimization engine module: This module analyzes the network data provided by the statistical information module by using the deep reinforcement learning algorithm. It models the network state by using the Markov decision process and optimizes the congestion control policy based on PPO. Certainly, the congestion control sub-policy also needs to be iteratively optimized with reference to historical empirical data to adapt to current network conditions.

Rate regulation control module: This module receives the congestion control policy output by the optimization engine module and performs corresponding rate adjustment based on the current network state. This module employs a parameterized rate regulation model, which includes four phases: fast recovery, adaptive adjustment, hyper increase, and rate reduction control. The module as a whole dynamically adjusts the data flow transmission rate through ECN marking and RTT feedback to ensure efficient utilization of network resources.

In the workflow of the system of the present disclosure, a closed-loop feedback control mechanism is used. Through continuously iterative cycle of evaluation-execution-policy generation, efficient network congestion control is achieved. First, the statistical information module collects network performance data and transmits the data to an optimization engine. The optimization engine analyzes the data and optimizes the congestion control sub-policy by using reinforcement learning to generate new policies that adapt to the current network state. Subsequently, a regulation control model executes the new policies to maximize network performance by adjusting the rate. The system continuously monitors for network state changes to ensure each decision making is based on latest data, thereby achieving more efficient network congestion control.

(2) Design and Implementation of Rate Regulation Model at Network End Side

The present disclosure calculates a convergence result by using a parameter and queuing delay to serve as a reference for rate adjustment, $$R_{REF} = \frac{1}{\delta \times d_q}$$

$$d_q = rtt_{new} - \min\{rtt_{new}, rtt_{min}\}$$

where δ is a regulation parameter, and 0.5≤δ≤1.5, and the parameter is used to indicate the state of total network bandwidth and transmission requirement. $d_q$ is the queuing delay and is a result obtained after such processing as serialization delay and minimum RTT is performed on an RTT feedback by using an algorithm.

A timer in the system performs an increment of 1 every 55 μs, and when the cumulative value exceeds a threshold F (default: 5), different rate-increasing phases are triggered. The rate update cycle needs to be adaptively adjusted based on network requirements. The parameter δ reflects the network requirements and is determined by link bandwidth and the number of connections. Therefore, the update cycle should be designed as:

$$T_a = \delta \times K$$

$$T{+}{+}$$

where $T_a$ is an adaptive byte counter threshold. Similarly, the byte counter has a fixed value 150 KB. The counter performs an increment of 1 each time a 150 KB packet is received. When the cumulative value exceeds the threshold, different rate-increasing phases are also triggered. To improve convergence speed and fairness, the adaptive byte counter should be designed to be independent of transmission rates:

$$BC_a = \gamma \times R_C$$

$$BC{+}{+}$$

where $BC_a$ is an adaptive byte counter threshold, γ is a regulation parameter and 0.5≤y≤1.5, and $R_C$ is a current transmission rate.

Design a rate decrease mechanism for regulation model: To accelerate the convergence speed, when the reference rate is far lower than a current rate, a model will substantially reduce speed to avoid severe congestion and quickly adjust to an ideal rate. The design is as follows:

$$R_T = \begin{cases} R_C, & R_C < 8R_{REF} \\ \dfrac{R_C}{\mu_1}, & \text{otherwise} \end{cases}$$

$$R_C = \begin{cases} R_C\left(1 - \dfrac{\alpha}{2}\right), & R_C < 8R_{REF} \\ \dfrac{R_C}{\mu_2} & \text{otherwise} \end{cases}$$

$$\alpha = (1 - g)\alpha + g$$

where parameters $\mu_1$ and $\mu_2$ are regulation parameters and $2<\mu_1\le\mu_2\le 4$. The parameters can control the aggressiveness of rate decrease when congestion occurs. If CNP is not received within a period of time, a needs to be updated.

$$\alpha = (1 - g)\alpha + g$$

Design a rate increase mechanism for regulation model: The rate increase is mainly divided into three phases: a fast recovery phase, an adaptive increase phase, and a hyper increase phase.

The first one is the fast recovery phase. When both the timer and the byte counter are smaller than the threshold, that is, T<F and BC<F, a fast recovery operation is performed, where $\mu_3$ is a regulation parameter and $6\le u_3\le 10$, The design is as follows:

$$R_T = \begin{cases} R_T, & R_C < 3R_{REF} \\ R_T - \frac{R_C}{\mu_3}, & \text{otherwise} \end{cases}$$

$$R_C = \frac{R_C + R_T}{2}$$

The second one is the adaptive increase phase. When the timer or the byte counter is greater than the threshold, that is, T≥F or BC≥F, an adaptive additive increase operation is performed. The adaptive increase step size should be related to the current transmission rate and the link bandwidth, but not to the number of carried flows. The design is as follows:

$$R_T = \begin{cases} R_T + \min(0.1R_C, \beta * R_L), & R_C < 3R_{REF} \\ R_T - \frac{R_C}{\mu_3}, & \text{otherwise} \end{cases}$$

$$R_C = \frac{R_C + R_T}{2}$$

where $R_L$ is link capacity, β and $\mu_3$ are regulation parameters and 0<β<1.

The last one is the hyper increase phase. When both the timer and the byte counter are greater than the threshold, that is, T≥F and BC≥F, a hyper increase operation is performed. The design is as follows:

$$R_T = \begin{cases} R_T + iR_{HAI}, & R_C < 3R_{REF} \\ R_T - \frac{R_C}{\mu_3}, & \text{otherwise} \end{cases}$$

$$R_C = \frac{R_C + R_T}{2}$$

where i=min(BC,T−F+1), $R_{HAI}$ is a fixed value 100 Mbps, and $\mu_3$ is a regulation parameter.

After an overall design of a regulation control model is determined, the present disclosure further sets a corresponding control parameter in the model to be dynamically adjustable, which is denoted as:

$$\theta := \{\delta, \gamma, \beta, \mu_1, \mu_2, \mu_3\}$$

Specifically, the parameter δ is used to indicate the state of the total network bandwidth and the transmission requirement, and is used to calculate a reference rate and provide rate adjustment direction and amplitude, while ensuring a reasonable timer threshold. The parameter γ regulates and controls the byte counter threshold to ensure that a rate increase interval is independent of the transmission rate. The parameter β ensures that the adaptive increase step size is related to the current transmission rate and the link bandwidth. The parameters $\mu_1$ and $\mu_2$ adjust in time the aggressiveness of rate decrease when congestion occurs to accelerate convergence. The parameter $\mu_3$ uniformly adjusts the conservativeness of rate increase to prevent recurrent congestion and accelerate convergence. Finally, the parameter set $\{\delta, \gamma, \beta, \mu_1, \mu_2, \mu_3\}$ determines a sending behavior of the model and is defined as an output of an RL agent. The present disclosure customizes a sub-policy to adapt to a current network condition by controlling the parameter settings.

(3) Design and Implementation of Optimization Engine RL Agent

Set state variables required by the algorithm: For the state information collected by the RL agent, the current network condition and flow state need to be comprehensively taken into account. The throughput (thr and $thr_{max}$), round-trip delay (rtt and $rtt_{min}$), and packet loss rate (loss) reflect the overall performance of the network, and in combination with measurement of the transmission rate ($\Delta R_t$), the availability of the network and bandwidth can be visualized, where $\Delta R_t=(R_t-R_{t-1})/\min(R_{t-1},R_t)$. In a general network, the three factors can fully describe the network condition. However, due to a large amount of burst traffic in the data center network (DCN), the switch buffer occupancy rate (Occ) is additionally introduced to describe the congestion degree, and the indicator is represented by the proportion of data packets marked with an ECN.

Set a reward function required by the algorithm: The RL agent needs to define a reward function to quantify the performance criterion of a task, thus instructing the agent to improve a generated sub-policy sequence in a training phase. The RL agent collects a reward at each monitoring interval to interact with a network environment. The reward function is designed as follows:

$$R = \left(\frac{thr - \omega_1 \times \text{loss}}{rtt'}\right) / \left(\frac{thr_{max}}{rtt_{min}}\right) + \omega_2 \times \Delta R_t - \omega_3 \times Occ$$

where:

$$rtt' = \begin{cases} rtt_{min}, & \text{if } rtt_{min} \le rtt_{min} \le \omega_4 \times rtt_{min} \\ rtt, & \text{otherwise} \end{cases}$$

In the above formula, the first part is designed based on full consideration of power=throughput/rtt. Power maximization can reflect a maximum throughput while minimizing network delay, and $\omega_1$ represents a penalty for a data packet loss; the second part considers the rate change of the sending rate and the switch buffer occupancy rate; $\omega_2$, $\omega_3$, and $\omega_4$ are weighting coefficients.

(4) Select an Optimization Algorithm to Optimize Parameters

The present disclosure needs to comprehensively consider the response timeliness and convergence speed of the algorithm. A reinforcement learning algorithm with slow convergence is not applicable, even if its performance is optimal. Stability of the RL algorithm is also critical, especially in environmentally sensitive situations. Because the data center may contain thousands of devices, an algorithm featuring high performance, low resources, and easy implementation is required. Proximal policy optimization (PPO) is selected to serve as an RL controller because of its features such as fast convergence, low sample complexity, and high performance. Besides, PPO is characterized by easy implementation, insensitivity to hyperparameter, low sample demands, fewer convergence steps, and no need to replay buffer memory. Its optimization function design ensures that a policy does not deviate greatly after each update, thereby ensuring the algorithm stability. These characteristics make PPO the best choice.

An objective function of PPO includes advantage estimation and probability ratio: $R_t(\theta)=\pi_\theta(a_t|s_t)/\pi_{\theta_{old}}(a_t|s_t)$, where $\pi_{\theta_{old}}$ is an old policy, and $\pi_\theta$ is an updated policy. To avoid large-scale policy updates, PPO clips a target to be within a range of the advantage estimation. The definitions are as follows:

$$L_t^1 = E\left[\min\left(R_t(\theta)\hat{A}_t,\ \text{clip}\ (R_t(\theta),\ 1-\grave{o},\ 1+\grave{o})\hat{A}_t\right)\right]$$

where $\hat{A}_t$ is the estimated advantage at time t, and ò is the hyperparameter that controls the clip range. An advantage function is a difference value between an expected value of a given action in a state and an expected value of all possible actions in the same state. To estimate the advantage function, PPO trains a value state function by using a neural network model (critic), calculates a total reward for a given state from start to expected implementation, and finally performs the advantage estimation by using generalized advantage estimation (GAE) based on the value of the critic network. An optimization function for training the critic model includes a squared error loss function:

$$L_t^2 = \left(V_\theta(s_t) - V_t^{target}\right)^2$$

By combining an actor loss with a critic loss and entropy, the agent's objective function is constructed, where $c_1$ and $c_2$ are coefficients.

$$S = \beta_{entropy} E\left[-\pi_\theta(a_t|s_t)\log\pi_\theta(a_t|s_t)\right]$$

$$\max_\theta E\left[L_t^1 - c_1 L_t^2 + c_2 S\right]$$

In each iteration of the PPO algorithm, multiple participants independently collect observed trajectory data for several time step sizes (state-action-reward sequence). For a given trajectory, the GAE algorithm computes the advantage estimate required for policy update at each time. Finally, using the collected data and estimates, the agent's function is maximized by stochastic gradient descent SGD (or similar methods).

Based on the above implementation process, those skilled in the art can learn that the present disclosure addresses, by combining adaptability of deep reinforcement learning with fast responsiveness of conventional model mapping, the problems of slow response speed and insufficient adaptability in a dynamic network environment in the prior art, can effectively reduce communication delay, reduce queue backlog, improve throughput, and enhance the stability of the data center network in a complex dynamic network environment, and is particularly applicable to high-load scenarios such as large AI model training. The method has a flexible structure and is easy to deploy, and thus can be widely applied to various computing network environments that require efficient congestion control.

What is claimed is:

1. A data-model dual-driven congestion control method for data center networks, comprising:

S1, constructing a system framework comprising an optimization engine module, a statistical information module, and a rate regulation control module, wherein the optimization engine module optimizes a congestion control sub-policy in real time by using an optimization algorithm, the statistical information module is responsible for collecting network operation data and providing support for a decision process and system monitoring of an optimization engine, the optimization engine module and the statistical information module jointly form an RL agent, and the regulation control module is configured to execute the sub-policy generated by the RL agent;

S2, constructing a parameterized rate regulation model for rates at a network end side, specifically comprising:

S21, calculating a convergence result by using a network parameter and queuing delay to serve as a reference for rate adjustment, wherein a calculation formula is as follows:

$$R_{REF} = \frac{1}{\delta \times d_q}$$

$$d_q = rtt_{new} - \min\{rtt_{new},\ rtt_{min}\}$$

wherein δ is a regulation parameter and 0.5≤δ≤1.5, and the parameter is used to indicate a state of total network bandwidth and transmission requirement, and $d_q$ is the queuing delay and is a result obtained after serialization delay and minimum RTT processing are performed on an RTT feedback;

a rate update cycle needs to be adaptively adjusted based on network requirements, the parameter δ reflects the network requirements and is determined by link bandwidth and the number of connections, and the update cycle is designed as:

$$T_a = \delta \times K$$

$$T{+}{+}$$

wherein $T_a$ is an adaptive byte counter threshold, K represents the link bandwidth, and T++ represents an update of a byte counter; to improve convergence speed and fairness, the adaptive byte counter is designed to be independent of transmission rates, that is:

$$BC_a = \gamma \times R_C$$

$$BC{+}{+}$$

wherein $BC_a$ is an adaptive byte counter threshold, γ is a regulation parameter and 0.5≤γ≤1.5, and $R_c$ is a current transmission rate;

S22, designing a rate decrease mechanism for the regulation model, specifically as follows:

$$R_T = \begin{cases} R_C, & R_C < 8R_{REF} \\ \frac{R_C}{\mu_1}, & \text{otherwise} \end{cases}$$

$$R_C = \begin{cases} R_C\left(1 - \frac{\alpha}{2}\right), & R_C < 8R_{REF} \\ \frac{R_C}{\mu_2}, & \text{otherwise} \end{cases}$$

wherein $R_T$ represents a target transmission rate that needs to be reached through adjustment, $R_c$ represents a current end-side transmission rate, parameters $\mu_1$ and $\mu_2$ are regulation parameters, and $2<\mu_1\leq\mu_2\leq 4$; the parameters are used to control aggressiveness of rate decrease when congestion occurs; if CNP is not received within a specified time, α needs to be updated, that is:

$$\alpha = (1-g)\alpha + g$$

wherein α is a regulation factor, and g is a fixed value for adjusting α;

S23, designing a rate increase mechanism for the regulation model, wherein the rate increase comprises a fast recovery phase, an adaptive increase phase, and a hyper increase phase;

the fast recovery phase: when both a timer and the byte counter are smaller than a threshold, that is, T<F and BC<F, a fast recovery operation is performed, wherein $\mu_3$ is a regulation parameter and $6 \le \mu_3 \le 10$, and the design is as follows:

$$R_T = \begin{cases} R_T, & R_C < 3R_{REF} \\ R_T - \dfrac{R_C}{\mu_3}, & \text{otherwise} \end{cases}$$

$$R_C = \frac{R_C + R_T}{2}$$

the adaptive increase phase: when the timer or the byte counter is greater than the threshold, that is, T≥F or BC≥F, an adaptive additive increase operation is performed, wherein an adaptive increase step size is related to the current transmission rate and the link bandwidth, but not to the number of carried flows, and the design is as follows:

$$R_T = \begin{cases} R_T + \min(0.1\,R_C, \beta * R_L), & R_C < 3R_{REF} \\ R_T - \dfrac{R_C}{\mu_3}, & \text{otherwise} \end{cases}$$

$$R_C = \frac{R_C + R_T}{2}$$

wherein $R_L$ is link capacity, β and $\mu_3$ are regulation parameters, and $0<\beta<1$;

the hyper increase phase: when both the timer and the byte counter are greater than the threshold, that is, T≥F and BC≥F, a hyper increase operation is performed, and the design is as follows:

$$R_T = \begin{cases} R_T + iR_{HAI}, & R_C < 3R_{REF} \\ R_T - \dfrac{R_C}{\mu_3}, & \text{otherwise} \end{cases}$$

$$R_C = \frac{R_C + R_T}{2}$$

wherein i=min (BC,T−F+1), $R_{HAI}$ is a fixed value 100 Mbps, and $\mu_3$ is a regulation parameter;

S24, setting a corresponding control parameter in the parameterized rate regulation model for rates at the network end side to be dynamically adjustable after an overall design of a regulation control model is determined, that is, defining θ as:

$$\theta := \{\delta, \gamma, \beta, \mu_1, \mu_2, \mu_3\}$$

S3, optimizing the dynamically adjustable parameter in S23 based on a DRL algorithm and formulates a congestion control problem in a network as a Markov decision model, wherein the model comprises setting state variables and a reward function, and for description of network conditions, a switch buffer occupancy rate Occ is introduced to describe congestion degree, and the indicator is represented by proportion of data packets marked with an ECN;

S4, designing and solving the state and the reward function in S3 based on the DRL algorithm, and selecting proximal policy optimization PPO as an RL controller, wherein the PPO algorithm performs policy optimization based on a Markov decision process.

2. The efficient data-model dual-driven congestion control method for data center networks according to claim 1, wherein a specific process of S3 comprises:

S31, setting the state variables required by the DRL algorithm the state variables comprise throughput, round-trip time, and a packet loss rate of a current network, further comprise measurement of a transmission rate, and visualize availability of the network and bandwidth, wherein the transmission rate $\Delta R_t = (R_t - R_{t-1})/\min(R_{t-1}, R_t)$;

S32, setting the reward function required by the DRL algorithm the reward function is used to quantify a performance criterion of a task, thus instructing an agent to improve a generated sub-policy sequence in a training phase, and the RL agent collects a reward at each monitoring interval to interact with a network environment;

the reward function is designed as follows:

$$R = \left(\frac{thr - \omega_1 \times \text{loss}}{rtt'}\right) \Big/ \left(\frac{thr_{max}}{rtt_{min}}\right) + \omega_2 \times \Delta R_t - \omega_3 \times Occ$$

wherein:

$$rtt' = \begin{cases} rtt_{min}, & \text{if } rtt_{min} \le rtt \le \omega_4 \times rtt_{min} \\ rtt, & \text{otherwise} \end{cases}$$

wherein $\omega_1$ represents a penalty for a data packet loss, and $\omega_2$, $\omega_3$, and $\omega_4$ are weighting coefficients.

3. The efficient data-model dual-driven congestion control method for data center networks according to claim 2, wherein the design of the reward function comprises considering that power=throughput/rtt, and power maximization is capable of reflecting a maximum throughput while minimizing network delay, and the design further comprises considering a rate change of a sending rate and the switch buffer occupancy rate.

4. The efficient data-model dual-driven congestion control method for data center networks according to claim 1, wherein an objective function of the PPO algorithm in S4 comprises advantage estimation and calculation of probability ratio;

an advantage function is a difference value between an expected value for a given action in a state and an expected value of all possible actions in the same state; to estimate the advantage function, the PPO trains a value state function by using a neural network model, calculates a total reward for a given state from start to expected implementation, and finally performs the advantage estimation by using generalized advantage estimation GAE based on a value of a critic network;

the calculation of the probability ratio is as follows: $R_t(\theta) = \pi_\theta(a_t|s_t) / \pi_{\theta_{old}}(a_t|s_t)$, wherein $\pi_{\theta_{old}}$ is an old policy, and $\pi_\theta$ is an updated policy;

to avoid large-scale policy updates, the PPO algorithm clips a target to be within a range of the advantage estimation, which is defined as follows:

$$L_t^1 = E\left[\min\left(R_t(\theta)\hat{A}_t,\ \text{clip}\ (R_t(\theta),\ 1-\epsilon,\ 1+\epsilon)\hat{A}_t\right)\right]$$

$\hat{A}_t$ is an estimated advantage at time t, and $\epsilon$ is a hyper-parameter that controls a clip range;

an optimization function for training the neural network model comprises a squared error loss function:

$$L_t^2 = \left(V_\theta(s_t) - V_t^{target}\right)^2$$

by combining an actor loss with a critic loss and entropy, the RL agent's objective function is constructed:

$$S = \beta_{entropy}\, E\left[-\pi_\theta(a_t|s_t) \log \pi_\theta(a_t|s_t)\right]$$

$$\max_\theta E\left[L_t^1 - c_1 L_t^2 + c_2 S\right]$$

wherein $c_1$ and $c_2$ are coefficients.

5. The efficient data-model dual-driven congestion control method for data center networks according to claim 4, wherein in each iteration of the PPO algorithm, participants independently collect observed trajectory data comprising a state-action-reward sequence;

for a given trajectory, the GAE algorithm computes advantage estimation required for policy update at each time;

finally, using the collected observed trajectory data and estimates, the agent's function is maximized by stochastic gradient descent SGD.

* * * * *